United States Patent
Levy et al.

(10) Patent No.: US 6,873,439 B2
(45) Date of Patent: Mar. 29, 2005

(54) VARIATIONAL MODELS FOR SPATIALLY DEPENDENT GAMUT MAPPING

(75) Inventors: Avraham Levy, Kiryat Tivon (IL); Doron Shaked, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 10/096,305

(22) Filed: Mar. 13, 2002

(65) Prior Publication Data

US 2003/0174885 A1 Sep. 18, 2003

(51) Int. Cl.⁷ .............................. B41B 1/00; G03F 3/08
(52) U.S. Cl. ........................................ 358/1.9; 358/520
(58) Field of Search .......................... 358/1.9, 520, 518, 358/535, 523, 3.23, 3.27, 1.16; 382/167, 162

(56) References Cited

U.S. PATENT DOCUMENTS

| | | | | |
|---|---|---|---|---|
| 5,377,025 A | * | 12/1994 | Spaulding et al. | 358/518 |
| 5,432,893 A | * | 7/1995 | Blasubramanian et al. | 345/600 |
| 5,611,030 A | * | 3/1997 | Stokes | 345/590 |
| 6,072,901 A | * | 6/2000 | Balonon-Rosen et al. | 382/167 |
| 6,078,307 A | * | 6/2000 | Daly | 345/132 |
| 6,249,616 B1 | * | 6/2001 | Hashimoto | 382/284 |
| 6,331,899 B1 | * | 12/2001 | Samadani | 358/1.9 |
| 6,480,299 B1 | * | 11/2002 | Drakopoulos et al. | 358/1.9 |
| 6,625,306 B1 | * | 9/2003 | Marshall et al. | 382/162 |
| 6,724,500 B1 | * | 4/2004 | Hains et al. | 358/1.9 |
| 2002/0097409 A1 | * | 7/2002 | Wexler et al. | 358/1.9 |
| 2003/0112454 A1 | * | 6/2003 | Woolfe et al. | 358/1.9 |

FOREIGN PATENT DOCUMENTS

| | | |
|---|---|---|
| EP | 1098510 | 5/2001 |
| WO | WO02104002 | 12/2002 |

* cited by examiner

Primary Examiner—Madeleine Nguyen (57) ABSTRACT

A variational model for spatially dependent gamut mapping is described that includes inputting a gamut constraint, choosing a one dimensional gamut projection scheme, including selecting a transform color coordinate system, computing transform equations, and verifying gamut conditions. The model also includes inputting an original image to be rendered, where the original image is in a given color coordinate system, transforming the gamut constraint, the image, and the transform equations to the transform color coordinate system, whereby a three dimensional function is transformed into a one dimensional quadratic functional, finding a minimum solution to the functional, and transforming a projected image in the transform color coordinate system into a color coordinate system of a rendering device.

17 Claims, 6 Drawing Sheets

VARIATIONAL MODELS FOR SPATIALLY DEPENDENT GAMUT MAPPING

TECHNICAL FIELD

The technical field is color image recreation.

BACKGROUND

Gamut mapping is a method that maps a color image into a constrained color space of a given rendering medium, while attempting to preserve the visual quality of the image. The target color space is termed "the color gamut volume." Classical gamut mapping algorithms use fixed color mapping look up tables and ignore the spatial color configuration of the projected image.

SUMMARY

To improve color image rendering, a variational model for gamut mapping is described which does not require the target gamut to be convex. The model comprises choosing a one dimensional gamut projection scheme, including selecting a transform color coordinate system, computing transform equations, and verifying gamut conditions; based on a given gamut constraint; inputting an original image to be rendered, wherein the original image is in a given color coordinate system; transforming the gamut constraint, the image, and the transform equations to the transform color coordinate system, whereby a three dimensional functional is transformed into a one dimensional quadratic functional; finding a minimum solution to the functional; and transforming a projected image in the transform color coordinate system into a target color coordinate system.

The halo elimination method may first be described in a one-dimensional formulation. Then, a true three-dimensional formulation can be reduced to the one-dimensional formulation. This reduction of the three-dimensional functional to a one-dimensional functional may also be used in other aspects of image processing besides halo elimination.

In an embodiment, the one dimensional functional is applied to a continuous image representation. In an alternative embodiment, the one dimensional functional is applied to a discrete image representation.

The variational model for gamut mapping may also be used to eliminate halos in a rendered image. Halos are artifacts that appear at object edges in the rendered image and are caused because there is no local restriction on the size of a projected image gradient. An embodiment of the variational model that solves the halo problem is based on the definition of a one dimensional gamut mapping problem in which the original image representation, denoted f(x), is assumed to be a positive, bounded and differentiable function defined on a bounded interval. A projected image representation, denoted g(x), which is a positive and differentiable function, constrained by g(x)≦c(x), is determined, with the objective that the projected image preserves the visual quality of the original image. This objective is translated into the requirement that an average distance between the values of the two functions f(x) and g(x) as well as an average distance between their derivative values (representing image edges) are small. To eliminate the halo phenomena, two additional constraints ((f')$^2$≧g'f'≧0) on the derivative g' of g restrict the variations of the projected image to be smaller than the variations of the original image. This additional constraints agree with the intuitive notion of projecting an image into a smaller gamut volume. The additional constraints guarantee that at each pixel the derivative of the projected image has the same sign but smaller value than the original image derivative. Given these constraints, a one dimensional functional comprising an image distance term and a corresponding derivative-distance term can be solved to yield a projected image that eliminates the halo problem. Additional improvements, e.g., replacing f(x) with min(f(x),c(x)) in an image distance term and requiring that g(x)≦min(c(x), f(x)) can be integrated into the one dimensional functional. Another embodiment of the variational model that solves the halo problem uses a relative distance between the derivatives, rather than an absolute distance as in the prior embodiment.

DESCRIPTION OF THE DRAWINGS

The Detailed Description will refer to the following drawings, in which like numerals refer to like objects, and in which.

DETAILED DESCRIPTION

Gamut mapping is used to modify a representation of a color image to fit into a constrained color space of a given rendering medium. For example, a laser-jet color printer that attempts to reproduce a color image on regular paper would have to map the photographed picture colors in a given color range, also known as the image "color gamut," into the given printer/page color gamut. Conventional gamut mapping methods involve a pixel by pixel mapping (usually a predefined look-up table) and ignore the spatial color configuration.

A variational approach for color image gamut mapping is based on an image difference measure which is a combination of two terms. The first term is the standard $L_2$ distance measure, aimed at preserving the original colors of the original image. The second term is the $L_2$ distance measure of the image gradient, which preserves the original image variations. The variational approach operates on each color channel, e.g., R, G and B, separately, and hence can be presented as a one dimensional (1D) approach.

Considering one color channel only, an image S can be represented by a positive, bounded and differentiable function, f(x,y), defined on a bounded domain Ω. To project this representation into a restricted color gamut, which reduces to projecting into a line interval in the 1D case, requires finding a positive and differentiable function g(x,y) that minimizes the functional:

$$\int_\Omega (k*(f-g))^2 dxdy + \alpha \int_\Omega (\nabla(k*(f-g)))^2 dxdy, \quad (1)$$

subject to $c_l$≦g(x,y)≦$C_h$, where $C_l$ and $C_h$ are constants that describe the 1D target gamut restriction, k(x,y) is a smoothing kernel, and α is a parameter. This minimization problem can be solved by an efficient quadratic programming (QP) iterative method. Also, and without loss of generality, the gamut constraint may be regarded as one sided such that g(x,y)≦c.

This variational approach to gamut mapping suffers from two main drawbacks. First, the efficient QP solution is based on separating the original three dimensional problem to three independent one dimensional problems, with each of the one dimensional problems having a simple constraint of the form $g(x,y) \leq c$. However, real color gamut volumes differ significantly from a simple box in any of the common color spaces. Hence, a real gamut mapping problem cannot be solved as three independent one dimensional problems. In fact, gamut volumes are typically non-convex bodies and hence the a solution based on the variational approach may not converge.

A second drawback with the variational approach is that the projected images produced by the variational approach have halo artifacts near image edges. Such halo artifacts are formed since there is no local restriction on the size of the projected image gradient.

A corrected variational formulation for the gamut mapping problem eliminates the halo phenomena, and, given certain assumptions, reduces the three dimensional gamut mapping problem into a one dimensional QP problem, even for non-convex color gamut volumes.

For simplification, the discussion that follows considers scalar functions, defined on a bounded interval. An extension to color images, which are three dimensional functions defined on to dimensional domains, will be described later.

An embodiment of the variational model that solves the halo problem is based on the following definition of the 1D gamut mapping problem: Let the original image representation, denoted f(x), be a positive, bounded and differentiable function defined on a bounded interval. Find a projected image representation, denoted g(x), which is a positive and differentiable function, constrained by $g(x) \leq c(x)$ with the objective that the projected image preserves the visual quality of the original image. This objective is translated into the requirement that an average distance between the values of the two functions as well as an average distance between their derivative values (representing image edges) are small. In order to eliminate the halo phenomena, an additional constraint restricts the variations of the projected image to be smaller than the variations of the original image. This additional constraint agrees with the intuitive notion of projecting an image into a smaller gamut volume. The corrected variational formulation describing the gamut mapping problem now reads: Find the function g(x) that minimizes the functional:

$$\int (k*(f-g))^2 dx + \alpha \int ((k*(f-g))')^2 dx, \quad (2)$$

subject to $g(x) \leq c(x)$ and $(f')^2 \geq g'f' \geq 0$. The second constraint $((f')^2 \geq g'f' \geq 0)$ guarantees that at each pixel the derivative of the projected image has the same sign but smaller value than the original image derivative. Additional improvements, e.g., replacing f(x) with min(f(x),c(x)) in the $L_2$ term and requiring that $g(x) \leq \min(c(x), f(x))$ can be integrated into this formulation (i.e., equation 2).

Another embodiment of the variational model that solves the halo problem uses a relative distance between the derivatives, rather than the absolute distance appearing in equation (2): Find the function g(x) that minimizes the functional:

$$\int (k*(f-g))^2 dx + \alpha \int \left(\frac{(k*g)}{(k*f)} - 1\right)^2 dx, \quad (3)$$

subject to the constraints $g(x) \leq \min(c(x), f(x))$ and $$0 \leq \frac{(k*g)'}{(k*f)'} \leq 1.$$

This optimization problem can be simplified by defining a new variable $$u = \frac{(k*g)'}{(k*f)'},$$

so that the above functional (equation (3)) becomes:

$$\int (k*(f-g))^2 dx + \alpha \int (u-1)^2 dx, \quad (3a)$$

and the set of constraints are: $g(x) \leq \min(c(x), f(x))$, $(k*g)' - u(k*f)' = 0$ and $0 \leq u \leq 1$.

The optimization problems represented by equations (2) and (3a) may be solved using standard discrete numeric schemes. The derivative operator in the continuous problems may be implemented in the discrete domain as a linear operation $g' \approx Dg$ where D is a matrix. Hence, the discrete problems corresponding to equations (2) and (3a) are QP problems, i.e., the minimization objective functional can be represented as a quadratic expression in g and the constraints are linear in g. Thus, standard QP solvers can be applied for solving equations (2) and (3a). Explicit formulation of a gamut mapping problem as a discrete QP problem will be described later.

Under certain conditions the three dimensional color gamut mapping problem corresponding to equation (2) can be mapped into a 1D gamut mapping problem, even when the gamut volume is not convex. Considering the three dimensional formulation of the variational gamut mapping problem, the original color image may be represented in a three dimensional color space by three bounded and differentiable functions, denoted $f^1$, $f^2$, $f^3$, defined on a bounded two dimensional domain $\Omega$. Let $\Gamma$ denote the restricted color gamut volume in this three dimensional color space. Three bounded and differentiable functions, denoted $f_p^1$, $f_p^2$, $f_p^3$, are needed that minimize the functional:

$$\sum_{i=1}^{3} \left( \alpha^i \int_\Omega (k'*(f^i - f_p^i))^2 dxdy + \beta^i \int_\Omega (\partial_x k'*(f^i - f_p^i))^2 dxdy + \beta^i \int_\Omega (\partial_y k'*(f^i - f_p^i))^2 dxdy \right) \quad (4)$$

subject to the constraints:

$$(f_p^1, f_p^2, f_p^3) \in \Gamma, \text{ and} \quad (4a)$$

$$(\partial_x f^i)^2 \geq (\partial_x f_p^i)(\partial_x f^i) \geq 0, \ (\partial_y f^i)^2 \geq (\partial_y f_p^i)(\partial_y f^i) \geq 0 \text{ for } i=1,2,3. \quad (4b)$$

In equations (4), (4a) and (4b), $\alpha^i$ and, $\beta^i$ are parameters, $k^i$ are smoothing kernels, and $\partial_x$, $\partial_y$ denote partial derivatives with respect to the spatial coordinates x,y, respectively.

The Euclidian metric used in equation (4) is considered a good approximation to the human color distance measure only when special color coordinates such as Lab are used.

Figure 1:
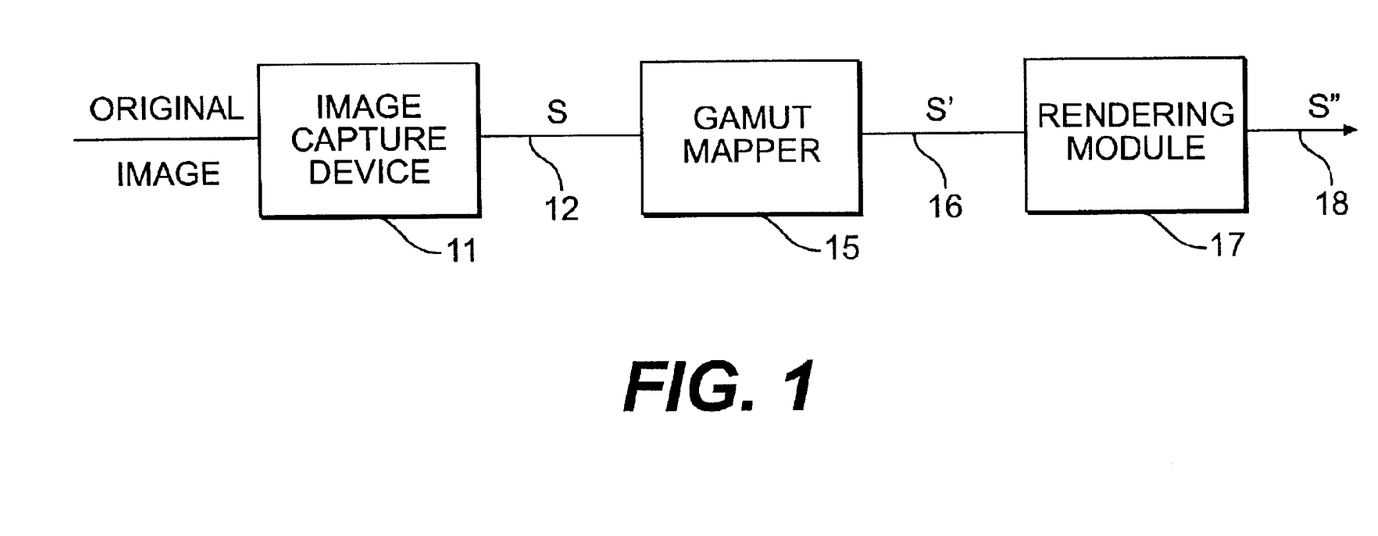
FIG. 1 is a block diagram of an apparatus that uses a variational approach for gamut mapping.

The above-described functional (Equation (4)) may be used in imaging devices to map a gamut of an image to the gamut of a device that attempts to reproduce the image. FIG. 1 is a block diagram of an apparatus 10 that may be used for gamut mapping according to the functional of Equation (4). An image capture device 11 receives an input original image and produces an output image S 12, which is an electrical signal representing a colorimetric value image. For example, the capture device 11 may convert at least three colorimetric values of each pixel of the original image into corresponding electrical signals. The electrical signals may indicate the L, a, b values, for example. Other colorimetric values may be the XYZ tristimulus value and the L, U, V or device dependent RGB values. A gamut mapper 15 produces an in-gamut image S' 16. Finally, a rendering module 17 provides a rendered image S" 18. The rendering module 17 may be implemented as a color laser printer. The thus-generated image S" 18 may represent a best-fit image, given gamut limitations of the device in which the image reproduction is to occur.

The image S 12 may represent the image as sensed by the capture module 13. The gamut mapper 15 applies an algorithm to extract and map the values of the image S 12 into the gamut of the image reproduction device 17. In particular, the gamut mapper 15 may apply an algorithm that solves the problem represented by equation (4), thereby solving the gamut mapping problem and optimizing the output image S" 18.

The optimization problem defined by equation (4) is no longer a quadratic QP problem since, in the general case, the constraint represented by equation (4a) is not linear. Even if this constraint (equation (4a)) is approximated by a set of linear inequalities, the gamut volume $\Gamma$ may not be convex and then equation (4) may have local minima. To overcome the second difficulty, the projections into $\Gamma$ may be restricted to one dimensional mappings. This restriction may produce a projected image that does not achieve the global optimum of equation (4). However, this restriction simplifies the solution to the gamut mapping problem significantly and performs better than classical gamut mapping algorithms, which are essentially one dimensional.

The above-described 1D projection scheme can be based on a gamut mapping projection method that satisfies the following conditions:

1. There exist three color coordinates denoted l, h, s such that the original coordinates $f^1$, $f^2$, $f^3$ can be written in the form:

$$f^i = m^i(l,h)s + n^i(l,h) \text{ for } i=1, 2, 3, \quad (5)$$

where $m^i$ and $n^i$ are differentiable functions.

2. The projection into $\Gamma$ is performed along those lines in the l,h,s color space, where l,h are kept constant and only the coordinate s is changed. The projected coordinates are thus $l_p = l$, $h_p = h$. An additional assumption of the variational model is that that $s_p \leq s$.

3. The gamut mapping volume $\Gamma$ has the following property: For each point in the $f^1$, $f^2$, $f^3$ color space, that point's projection on the surface of $\Gamma$ along the curves with l,h constant, exists and is unique. Therefore, there exists a well defined continuous projection function $s_\Gamma(s,l,h)$ that maps the s coordinate of each color point outside of $\Gamma$ to the s coordinate of a unique point on the surface of $\Gamma$ (and for a point s,l,h inside $\Gamma$: $s_\Gamma(s,l,h)=s$).

Figure 2A:
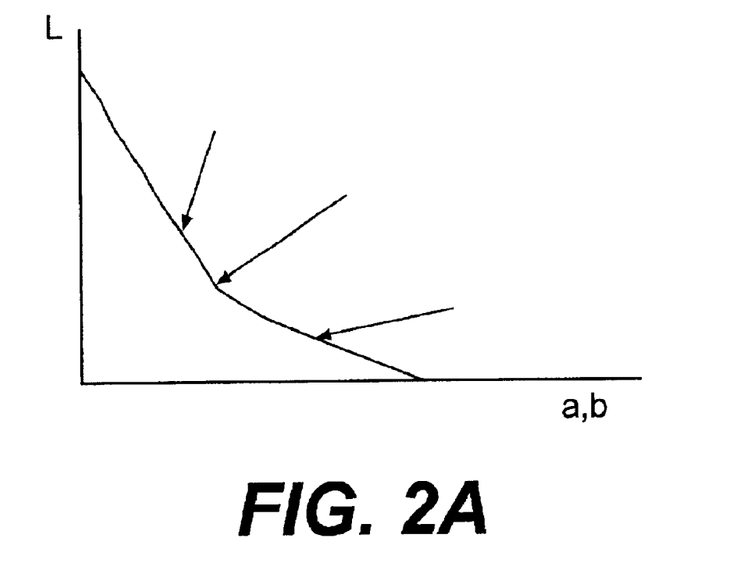
FIGS. 2A and 2B illustrate one dimensional image projections for non-convex gamut volumes.
Figure 2B:
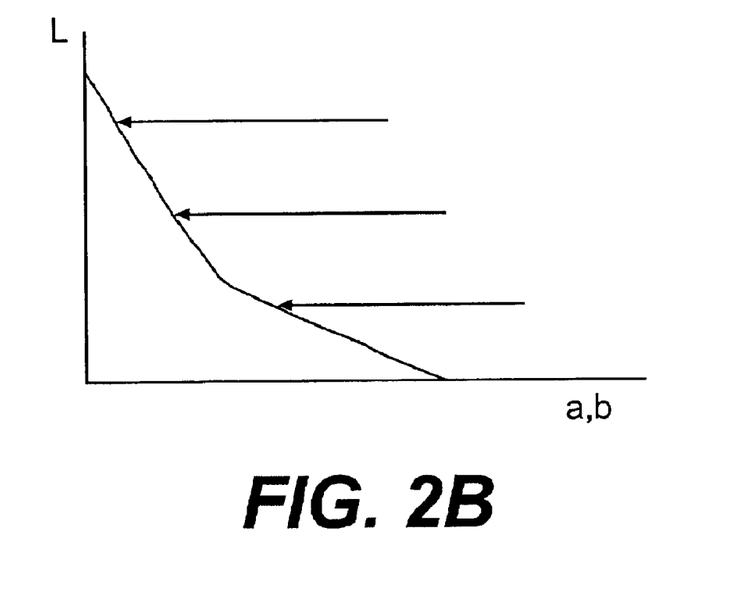

One of ordinary skill in the art will readily appreciate that 1D projections that satisfy the above conditions may be defined even for non convex gamut volumes. For example, if the original color space is the Lab space with s, h, l defined to be the standard spherical coordinates (where the L axis plays the roll of the z axis in the standard Cartesian system), then: L=s cos(1); a=s sin(1)cos(h); b=s sin(Z)sin(h) and the projection is along the radius to the origin, as illustrated in FIG. 2A. In another example, if the original color space is the Lab space and l, s, h are defined to be the standard cylindrical coordinates (where the L axis plays the roll of the z axis in the standard Cartesian system), then: L=l; a=s cos(h); b=s sin(h) and the projection is performed along lines parallel to the (a,b) plane, as shown in FIG. 2B.

As will now be described, the optimization problem represented by equation (4) may be transformed into a 1D QP problem when the projection from the image color coordinates $f^1, f^2, f^3$ to the new coordinates $f_p^1, f_p^2, f_p^3$ satisfies conditions (1), (2) and (3) defined above. In the new color coordinates $h_p = h$, $l_p = l$ and hence the only unknown function is $s_p(x,y)$.

In the original color space the constraint represented by equation 4(a) is $(f_p^1, f_p^2, f_p^3) \in \Gamma$. If the representation of the original image in the new color coordinates is l(x,y),h(x,y), s(x,y), then the gamut volume constraint is: $l_p = l, h_p = h$ and $s_p \leq s_\Gamma(s,l,h)$. Thus, the unknown function $s_p(x,y)$ should satisfy a constraint of the form: $s_p(x,y) \leq c(x,y)$, where $c(x,y) = s_\Gamma(s(x,y), l(x,y), h(x,y))$. This constraint is linear in $s_p(x,y)$.

In the original color space the constraints represented by equation 4(b) are:

$$(\partial_x f^i)^2 \geq (\partial_x f_p^i)(\partial_x f^i) \geq 0, (\partial_y f^i)^2 \geq (\partial_y f_p^i)(\partial_y f^i) \geq 0 \text{ for } i=1,2,3.$$

Substituting equation (5) in the first constraint yields:

$$(\partial_x f^i)^2 \geq (\partial_x f^i)(\partial_x (m^i s_p + n^i)) \geq 0.$$

Denoting by $f_x^i, m_x^i, n_x^i$ the functions $\partial_x f^i, \partial_x a^i, \partial_x b^i$, respectively, the previous inequality can be simplified to:

$$(f_x^i)^2 - (f_x^i)(n_x^i) \geq (f_x^i)(m_x^i)s_p + (f_x^i)(m^i)\partial_x s_p \geq -(f_x^i)(n_x^i), \quad (6a)$$

which is a linear inequality in $s_p$.

A similar computation, applied to the second inequality, which relates to the y derivative, yields:

$$(f_y^i)^2 - (f_y^i)(n_y^i) \geq (f_y^i)(m_y^i)s_p + (f_y^i)(m^i)\partial_y s_p \geq -(f_y^i)(n_y^i), \quad (6b)$$

The functional represented by equation (4) is quadratic in the original coordinates $f_p^1, f_p^2, f_p^3$ and, according to equation (5), these coordinates can be written as a linear expression in $s_p$. Thus, the functional of equation (4) is quadratic in $s_p$. The explicit expressions may be obtained by computing:

$$\int_\Omega (k' * (f^i - f_p^i))^2 dxdy = \qquad (7a)$$

$$\int_\Omega (k' * (m^i s - m^i s_p))^2 dxdy = \int_\Omega (k' * (m^i (s - s_p)))^2 dxdy, \text{ and}$$

$$\int_\Omega (\partial_x (k' * (f^i - f_p^i)))^2 dxdy = \qquad (7b)$$

$$\int_\Omega (\partial_x (k' * (m^i s - m^i s_p)))^2 dxdy = \int_\Omega (\partial_x (k' * (m^i (s - s_p))))^2 dxdy.$$

Figure 3A:
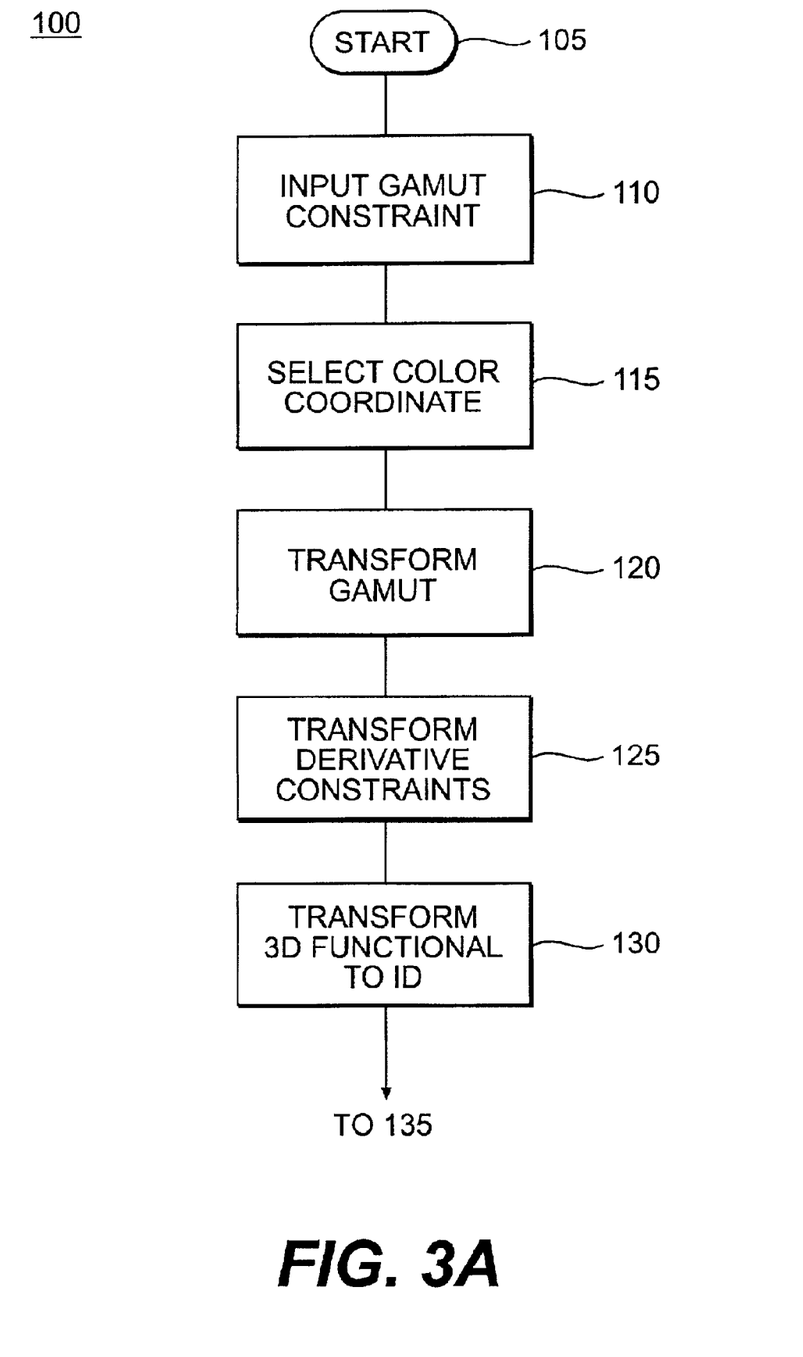
FIGS. 3A and 3B are a flowchart illustrating an operation of the apparatus of FIG. 1.
Figure 3B:
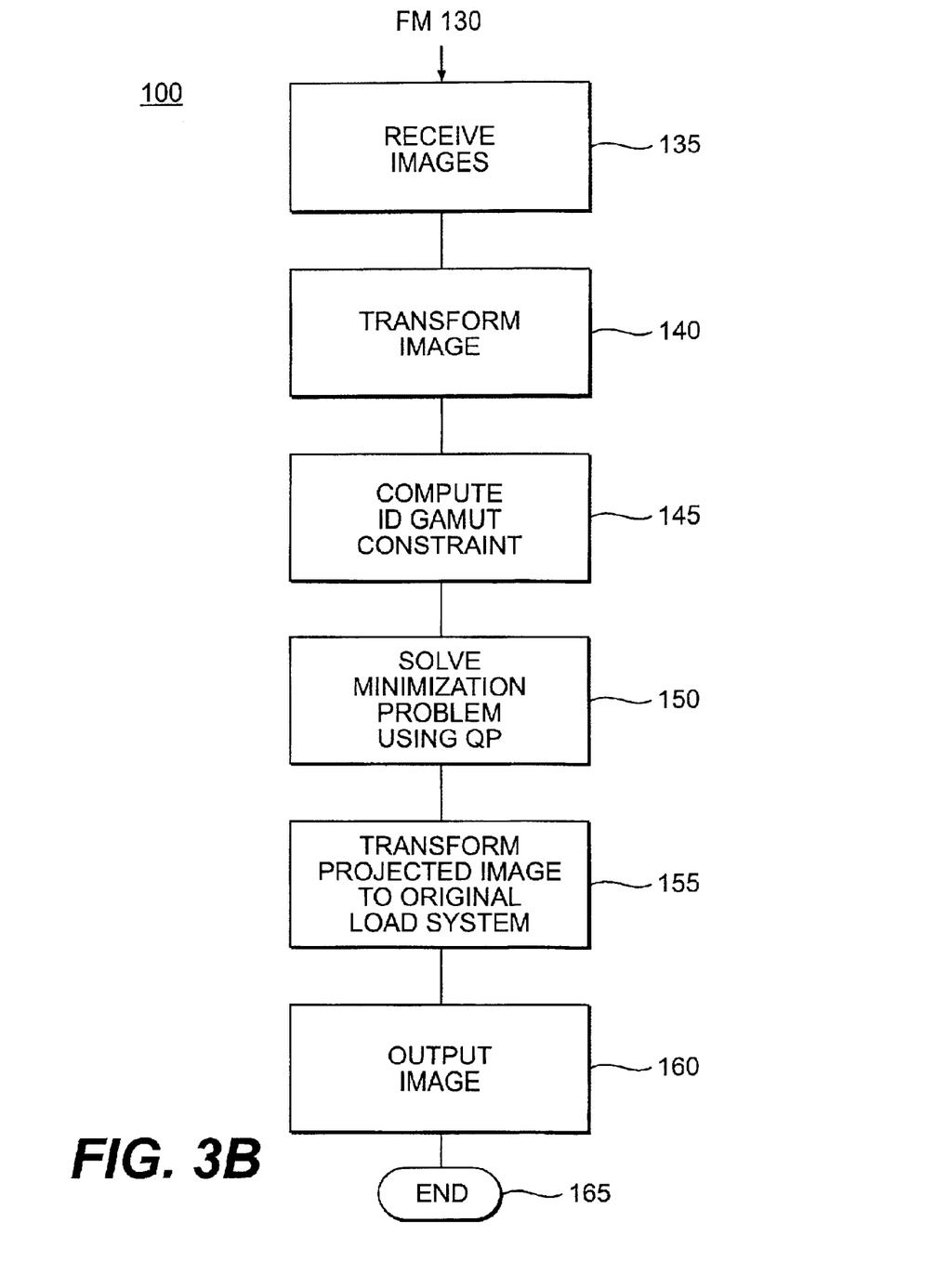

An operation 100 of the complete three dimensional gamut mapping algorithm to solve the optimization problem of equation (4) using the restricted 1D projection will now be described with reference to FIGS. 3A and 3B. The operation 100 is a generic process for spatially dependent gamut mapping, and includes an off-line part (FIG. 3(A)) and an on-line part (FIG. 3(B)). Once the off-line part is complete, any color image may be processed according to the on-line part.

The operation 100 begins in block 105. In block 110, the gamut constraint is input. In block 115, a 1D gamut projection scheme is determined by choosing the color coordinates l,h,s, deriving $m^i(l,h)$, and $n^i(l,h)$ for i=1, 2, 3, from the transformation equations $f^i = m^i(l,h)s + n^i(l,h)$, and verifying that projecting along the s coordinate with respect to the given gamut volume Γ satisfies conditions (1), (2) and (3) noted above. Next, in block 120, the representation of the gamut volume is computed in the new coordinates and the 1D projection function $s_\Gamma(s,l,h)$ is derived.

In block 125, the new representation of the derivative constraints of equation (4b) is computed by substituting the transformation $f^i=m^i(l,h)s+n^i(l,h)$ for i=1,2,3 and using equations (6a) and (6b). In block 130, the 3D functional (4) is transformed to a 1D quadratic functional in the function $s_p(x,y)$, by substituting the transformation $f^i=m^i(l,h)s+n^i(l,h)$ for i=1,2,3 and using equations (7a) and (7b). The new functional has the form:

$$\sum_{i=1}^{3}\left(\alpha'\int_\Omega (k'*(m'(s-s_p)))^2 dxdy\right)+ \tag{8}$$

$$\sum_{i=1}^{3}\left(\beta'\int_\Omega (\partial_x(k'*(m'(s-s_p))))^2 dxdy+\right.$$

$$\left.\beta'\int_\Omega (\partial_y(k'*(m'(s-s_p))))^2 dxdy\right)$$

The operation 100 may now be considered complete in terms of establishing baseline conditions for processing a specific image S. The operation 100 then moves to block 135 for image processing of the specific image S.

In block 135, the image S is input. In block 140, compute the representation of the original image in the new color coordinate l(x,y), h(x,y), s(x,y). In block 145, substitute the l,h,s representation of the image S in the projection function $s_\Gamma(s,l,h)$ and compute the constraint function $c(x,y)=s_\Gamma(s(x,y), l(x,y), h(x,y))$.

In block 150, find the function $\tilde{s}_p(x,y)$ that minimizes equation (8), subject to the gamut constraint $s_p(x,y) \leq c(x,y)$ and the constraints of equations (6a) and (6b), using a standard QP solver. The optimal projected image is represented in the l,h,s color space by $l_p(x,y)=l(x,y)$, $h_p(x,y)=h(x,y)$, $s_p(x,y)=\tilde{s}_p(x,y)$. In block 155, transform the projected image from the representation $l_p, h_p, s_p$ back to the $f_p^1, f_p^2, f_p^3$ color representation. In block 160, output the image S. In block 165, the operation 100 ends.

Figure 4A:
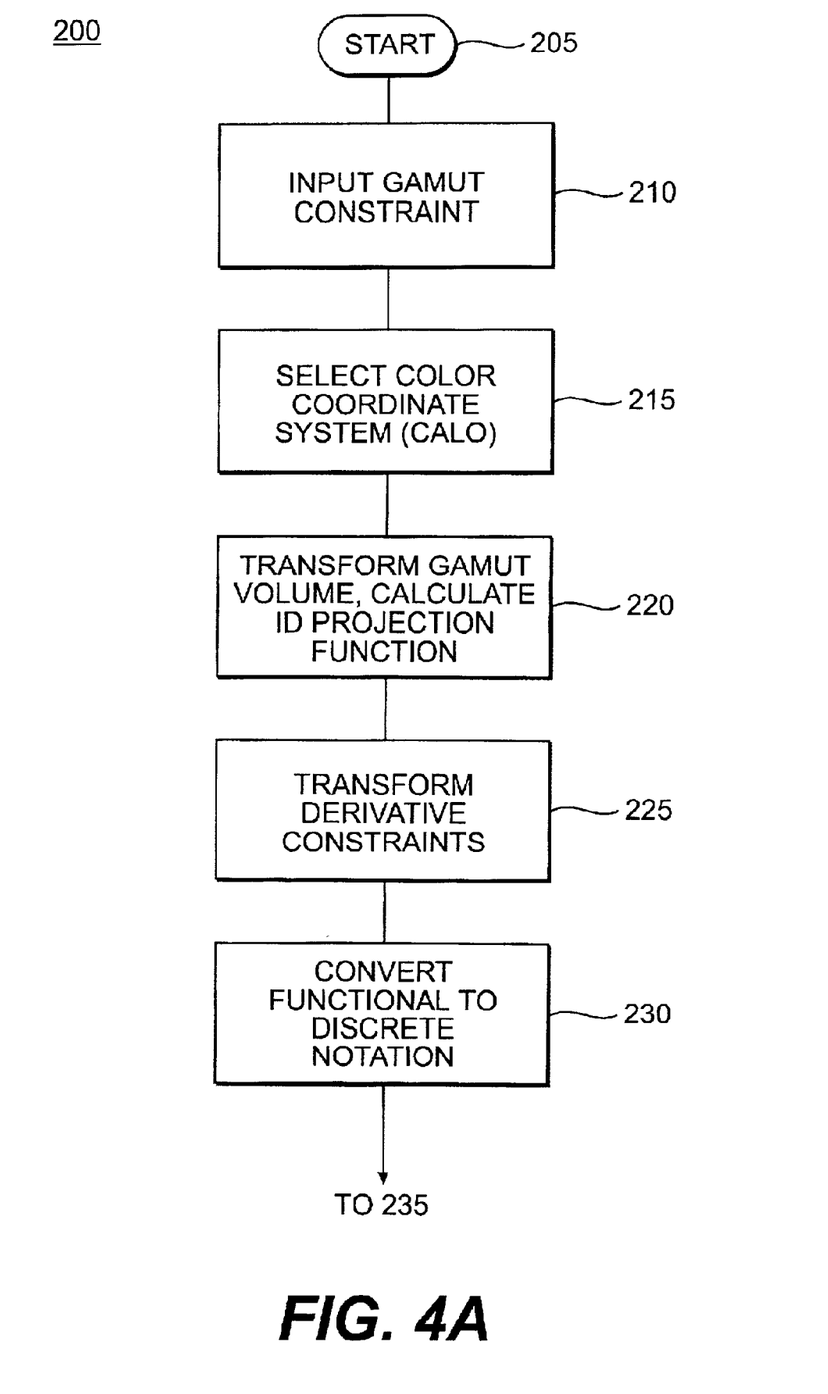
FIGS. 4A and 4B are a flowchart illustrating an alternate operation of the apparatus of FIG. 1.
Figure 4B:
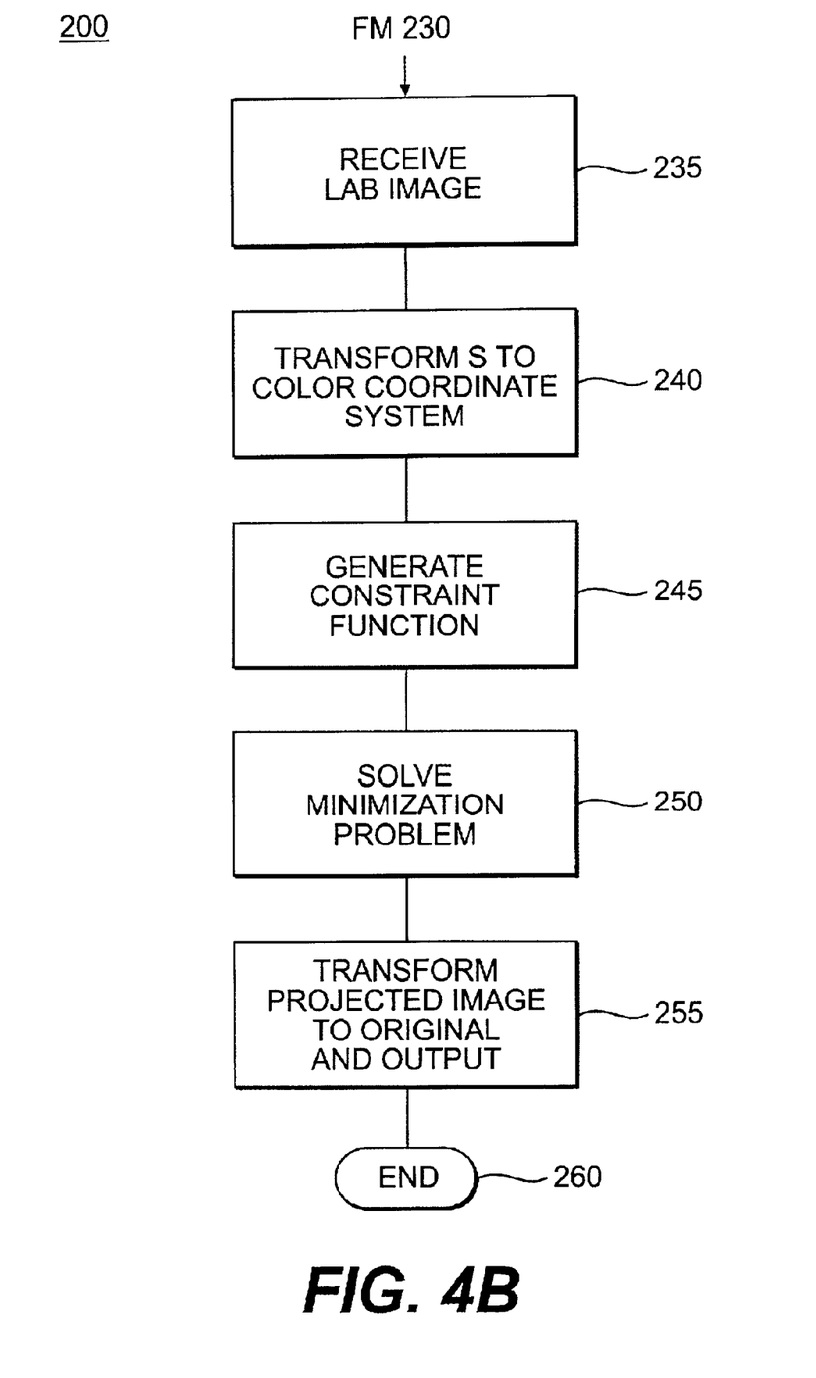

FIGS. 4(A) and 4(B) illustrate an operation 200 in which the functional of equation (4) is solved using the three dimensional gamut algorithm based on the intensity preserving 1D projection shown in FIG. 2B. The operation 200 is a more specific example of the operation 100 shown in FIGS. 3(A) and 3(B), and relates to color transformation in the Lab color space. An original image S is represented in the Lab color space by (L(x,y), a(x,y), b(x,y)) and the gamut volume surface, denoted ∂Γ, is described in the same color space by a parametric representation $(L^\Gamma(u,v), a^\Gamma(u,v), b^\Gamma(u,v))$. The operation 200 includes an off-line part (FIG. 4(a)) and an on-line part (FIG. 4(b)). Once the off-line part is complete, any color image in the Lab space may be received and processed according to the on-line part.

In the operation 200, the image coordinates (x,y) are assumed to be discrete and hence the continuous formulation of the operation 100 is converted, when required, to a discrete representation. In this discrete representation, the derivative operators $\partial_x, \partial_y$ are replaced with standard matrix representations $D_x, D_y$ respectively and the integral formulation of equation (8) is substituted with a corresponding quadratic form. For a discrete image w the notation $w_x$ is an abbreviation for $D_x w$ and the operator of point-wise multiplication with w is denoted by (w). Using these notations the gamut algorithm operates as follows:

Referring to FIG. 4(A), the operation 200 starts in block 205. In block 210, the gamut constraint is input. In block 210, new color coordinates l,h,s are chosen as:

$$l=L; h=\arccos\left(\frac{b}{\sqrt{a^2+b^2}}\right); s=\sqrt{a^2+b^2} \tag{9a}$$

and the inverse transformation is therefore:

$$L=l; a=s\sin(h); b=s\cos(h). \tag{9b}$$

The derived 1D projection is performed along lines that are parallel to the (a,b) plane and intersect with the L axis. The gamut surface ∂Γ is assumed to have only one point of intersection, in each quadrant, with such lines.

In block 220, the gamut restriction is transformed to the l,h,s color space using equation (9a). The new representation is $(l^\Gamma(u,v), h^\Gamma(u,v), s^\Gamma(u,v))$. The 1D projection function $s_\Gamma(s,l,h)$ is calculated by the following procedure: For each pair (l,h) find the coordinates (u(l,h),v(l,h)) that solve the system $l=l^\Gamma(u,v); h=h^\Gamma(u,v)$. By condition (3), this system has a unique solution and hence there is a well-defined projection function $S_\Gamma(s,l,h)=\min(s, s^\Gamma(u(l,h),v(l,h)))$.

In block 225, the derivative constraints (6a) and (6b) are transformed, and in discrete notation read:

$$(a_x)^2 \geq (a_x)[(h_x)(\cos(h))+(\sin(h))D_x]s_p \geq 0$$

$$(b_x)^2 \geq (b_x)[-(h_x)(\sin(h))+(\cos(h))D_x]s_p \geq 0$$

$$(a_y)^2 \geq (a_y)[(h_y)(\cos(h))+(\sin(h))D_y]s_p \geq 0$$

$$(b_y)^2 \geq (b_y)[-(h_y)(\sin(h))+(\cos(h))D_y]s_p \geq 0 \tag{6c}$$

Finally, in block 230, direct computation of equation (8), in discrete representation, yields:

$$(s-s_p)^T(H_a+H_b)(s-s_p)$$

where $H_a=(\sin(h))K_a^T(\alpha^a I+\beta^a D_x^T D_x+\beta^a D_y^T D_y)K_a(\sin(h))$ and $H_b=(\cos(h))K_b^T(\alpha^b I+\beta^b D_x^T D_x+\beta^b D_y^T D_y)K_b(\cos(h))$ $K_a$ and $K_b$ are the discrete representations of the convolution kernel k.

FIG. 4(B) represents the on-line part of the operation 200. In block 235, the original image S is received and in block 240, is transformed to the l, h, s color space using equation (9a). The coordinates of the new representation are denoted: l(x,y), h(x,y), s(x,y).

In block 245, substituting the l(x,y), h(x,y), s(x,y) representation of the original image S in the projection function $s_\Gamma(s,l,h)$ yields the constraint function $c(x,y)=s_\Gamma(s(x,y), l(x,y), h(x,y))$.

In block 250, denoting $\tilde{s}_p(x,y)$ as the image that minimizes equation (8), subject to the gamut constraint $s_p(x,y) \leq c(x,y)$ and the derivative constraints of equation (6c), the optimal projected image is represented in the l,h,s color space by:

$$l_p(x,y)=l(x,y), h_p(x,y)=h(x,y), s_p(x,y)=\tilde{s}_p(x,y).$$

In block 255, the Lab representation of the projected image is obtained using equation (9b):

$$L_p=l_p; a_p=s_p\sin(h_p); b_p=s_p\cos(h_p)$$

In block 260, the operation 200 ends.

What is claimed is:

1. A method for rendering color images using spatially dependent gamut mapping, comprising:
   inputting a gamut constraint;

choosing a one dimensional gamut projection scheme, comprising:
    selecting a transform color coordinate system,
    computing transform equations, and
    verifying gamut conditions;
inputting an original image to be rendered, wherein the original image is in a given color coordinate system;
transforming the gamut constraint, the image, and the transform equations to the transform color coordinate system, whereby a three dimensional quadratic functional is transformed into a one dimensional quadratic functional;
finding a minimum solution to the functional subject to the gamut constraint and a derivative constraint; and
transforming a projected image in the transform color coordinate system into a color coordinate system of a rendering device.

2. The method of claim 1, wherein the three dimensional functional is given by:

$$\sum_{i=1}^{3}\left(\alpha^i \int_\Omega (k' * (f^i - f_p^i))^2 dxdy + \beta^i \int_\Omega (\partial_x k' * (f^i - f_p^i))^2 dxdy + \beta^i \int_\Omega (\partial_y k' * (f^i - f_p^i))^2 dxdy\right).$$

3. The method of claim 2, wherein the functional is subject to the constraints:
$(f_p^1, f_p^2, f_p^3) \in \Gamma$, and
$(\partial_x f^i)^2 \geq (\partial_x f_p^i)(\partial_x f_p^i) \geq 0$, $(\partial_y f^i)^2 \geq (\partial_y f_p^i)(\partial_y f_p^i) \geq 0$ for $i=1, 2, 3$, and wherein $\alpha^i, \beta^i$ are parameters, $k^i$ are smoothing kernels, $f^i$ is an original coordinate, $f_p^i$ is a projection of the original coordinate, and $\partial_x, \partial_y$ denote partial derivatives with respect to the spatial coordinates x,y, respectively.

4. The method of claim 1, wherein the transformed, one dimensional functional is given by:

$$\sum_{i=1}^{3}\left(\partial^i \int_\Omega (k' * (m'(s-s_p)))^2 dxdy\right) + \sum_{i=1}^{3}\left(\beta^i \int_\Omega (\partial_x (k' * (m'(s-s_p))))^2 dxdy + \beta^i \int_\Omega (\partial_y k' * (m'(s-s_p)))\right)^2 dxdy\right)$$

subject to:

$(f_x^i)^2 - (f_x^i)(n_x^i) \geq (f_x^i)(m_x^i)s_p + (f_x^i)(m^i)\partial_x s_p \geq -(f_x^i)(n_x^i),$
$(f_y^i)^2 - (f_y^i)(n_y^i) \geq (f_y^i)(m_y^i)s_p + (f_y^i)(m^i)\partial_y s_p \geq -(f_y^i)(n_y^i),$ wherein $s_p$ is a projection of s onto a target gamut and $m^i$ and $n^i$ are differentiable functions.

5. The method of claim 1, wherein the color coordinates are l,h,s, and wherein the transform equations are $f^i = m^i(l,h)s + n^i(l,h)$.

6. A method for rendering color images using spatially dependent gamut mapping, comprising:
    receiving an original image representation, wherein the original image representation is defined by a positive, bounded and differentiable first function f;
    mapping the original color image into a gamut space, wherein the mapped image representation is a positive differentiable second function g; and
    first minimizing a distance measure between the first function f and the second function g.

7. The method of claim 6, further comprising second minimizing a distance measure between a derivative f' of the first function f and a derivative g' of the second function g, wherein $(f')^2 \geq g'f' \geq 0$.

8. The method of claim 7, wherein the first and the second minimizing steps are completed to minimize a one dimensional functional:

$$\int (k*(f-g))^2 dx + \alpha \int ((k*(f-g))')^2 dx.$$

9. The method of claim 6, further comprising second minimizing a relative distance measure between a derivative f' of the first function f and a derivative g' of the second function, wherein $g < \min(c,f)$ and $$0 \leq \frac{(k*g)'}{(k*f)'} \leq 1,$$

wherein k is a smoothing kernel.

10. The method of claim 9, wherein the first and the second minimizing steps are completed to minimize a one dimensional functional:

$$\int (k*(f-g))^2 dx + \alpha \int \left(\frac{(k*g)}{(k*f)} - 1\right)^2 dx.$$

11. A method for rendering color images using spatially dependent gamut mapping, comprising:
    receiving an input color image in a Lab space;
    defining new color coordinates l,h,s according to transform function $$l = L; h = \arccos\left(\frac{b}{\sqrt{a^2+b^2}}\right); s = \sqrt{a^2+b^2};$$

inputting a gamut constraint for a gamut volume;
    transforming the gamut volume, the image, and the gamut constraint using the transform function, whereby a three dimensional functional is transformed into a one dimensional quadratic functional;
    finding a minimum solution to the one dimensional functional, wherein a projected image is derived; and
    transforming the projected image in the new color coordinate system into the Lab space color coordinate system.

12. The method of claim 11, wherein image coordinates (x,y) of the image are assumed to be discrete, and wherein the one dimensional functional is of the form $$(s-s_p)^T (H_a - H_b)(s-s_p)$$

where $H_a = (\sin(h))K_a^T(\alpha^a I + \beta^a D_x^T D_x + \beta^a D_y^T D_y)K_a(\sin(h))$
and $H_b = (\cos(h))K_b^T(\alpha^b I + \beta^b D_x^T D_x + \beta^b D_y^T D_y)K_b(\cos(h))$
wherein $D_x, D_y$, are matrix representations of derivatives, $K_a, K_b$ are matrix representations of convolution kernels, and $\alpha^i, \beta^i$ are parameters.

13. A computer readable medium, comprising programming for spatially dependent gamut mapping, wherein the mapping is carried out according to the steps of:
    receiving an original image representation, wherein the original image representation is defined by a positive, bounded and differentiable first function f;

mapping the original color image into a gamut space, wherein the mapped image representation is a positive differentiable second function g; and first minimizing a distance measure between the first function f and the second function g.

14. The computer readable medium of claim 13, wherein the mapping further comprises second minimizing a distance measure between a derivative f' of the first function f and a derivative g' of the second function g, wherein $(f')^2 \geq g'f' \geq 0$.

15. The computer readable medium of claim 14, wherein the first and the second minimizing steps are completed to minimize a one dimensional functional:

$$\int (k*(f-g))^2 dx + \alpha \int ((k*(f-g))^1)^2 dx.$$

16. The computer readable medium of claim 13, wherein the mapping further comprises second minimizing a relative distance measure between a derivative f' of the first function f and a derivative g' of the second function, wherein g<min(c,f) and $$0 \leq \frac{(k*g)'}{(k*f)'} \leq 1,$$

wherein k is a smoothing kernel.

17. The computer readable medium of claim 16, wherein the first and the second minimizing steps are completed to minimize a one dimensional functional:

$$\int (k*(f-g))^2 dx + \alpha \int \left( \frac{(k*g)}{(k*f)} - 1 \right)^2 dx.$$

* * * * *